May 16, 1967 C. R. ELLISON 3,319,638
ENGINE BLOCK WASHING TANK
Filed Sept. 23, 1965 4 Sheets-Sheet 2

INVENTOR
CLAUDE R. ELLISON

BY Semmes & Semmes
ATTORNEYS

May 16, 1967

C. R. ELLISON 3,319,638

ENGINE BLOCK WASHING TANK

Filed Sept. 23, 1965

INVENTOR
CLAUDE R. ELLISON

BY *Semmes & Semmes*

ATTORNEYS

May 16, 1967  C. R. ELLISON  3,319,638
ENGINE BLOCK WASHING TANK

Filed Sept. 23, 1965  4 Sheets-Sheet 4

INVENTOR
CLAUDE R. ELLISON

BY Semmes & Semmes
ATTORNEYS

United States Patent Office 3,319,638
Patented May 16, 1967

3,319,638
ENGINE BLOCK WASHING TANK
Claude R. Ellison, Saluda Dam Road, Rte. 1,
Greenville, S.C. 29611
Filed Sept. 23, 1965, Ser. No. 489,715
8 Claims. (Cl. 134—107)

The present invention relates to an engine block washing tank, particularly a tank and liquid circulating system for agitating detergent and liquid about an engine block immersed in said tank for cleaning.

Numerous previous inventors have devised liquid baths for engine blocks, cast iron and aluminum articles desired to be cleaned by the action of detergent and turbulent liquid. The majority of said tanks have a 150 to 200 gallon capicity impeller-type pump, the tank having an inclined bottom to collect the sludge worked from the engine block or parts being cleaned.

A principal shortcoming of these earlier devices has been their ineffectiveness in distributing liquid and detergent throughout the entire tank as well as the lack of any positive controls for recirculating and heating the liquid and for preheating the post-bath rinse liquid. Applicant's invention consists, therefore, in an improved washing tank, having a liquid impeller circulation system, heating and preheating elements as well as a simple and readily adjustable distribution system so that an engine block, a basket of parts or the like may be readily cleaned by immersion and circulation of the liquid throughout the tank.

Accordingly, it is an object of invention to provide an industrial washing tank having improved operating characteristics.

Another object of the invention is to provide an engine block washing tank having a comprehensive liquid distribution outlet system.

Another object of invention is to provide an engine block washing tank having a preheating system for preheating post-bath rinse liquid.

Yet additional objects of invention will become apparent from the ensuing specification and attached drawings, wherein.

Figure 1:
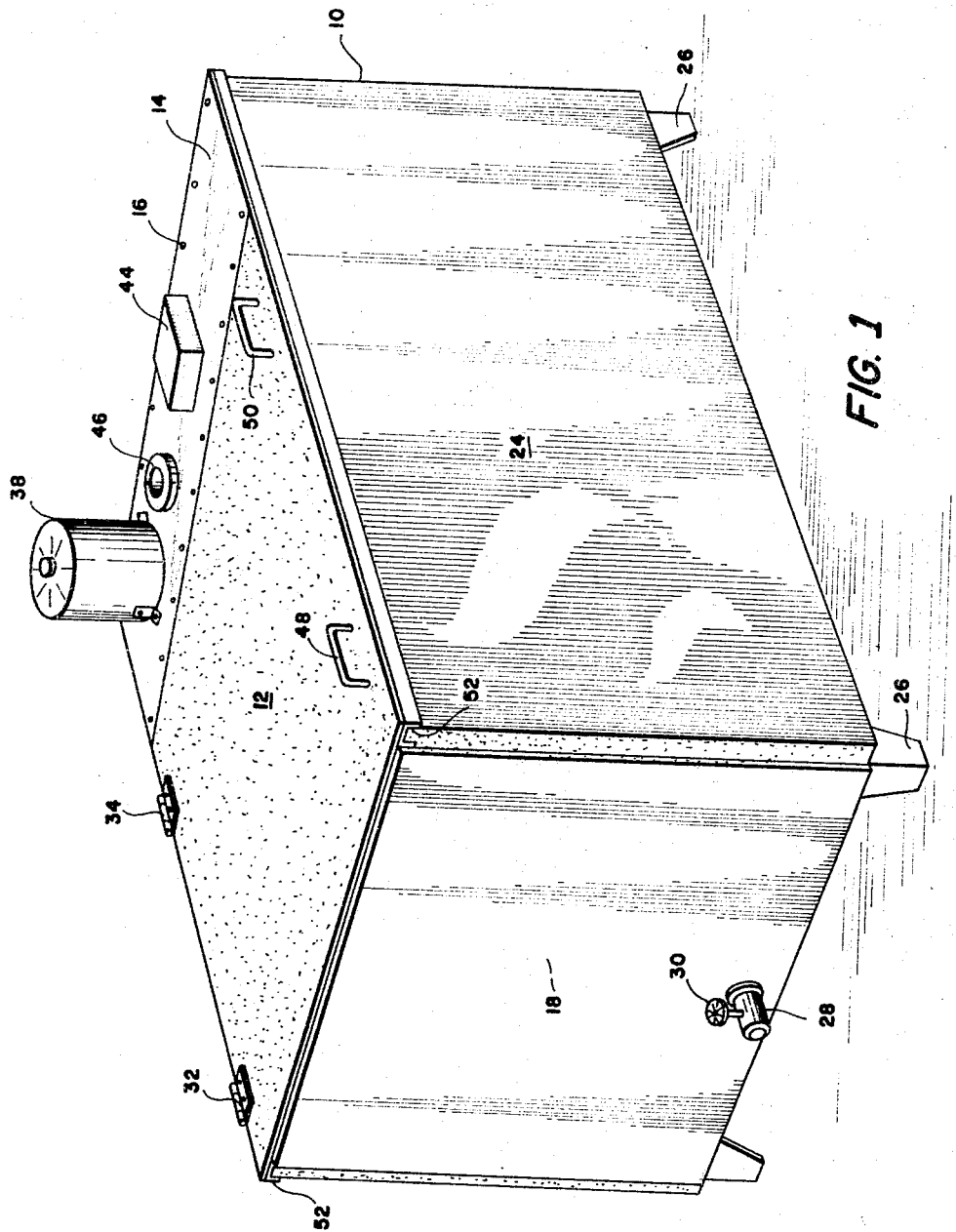
FIG. 1 is a perspective view of the washing tank with cover closed and impeller motor and thermostat control mounted at a partitional end of the tank.

In FIG. 1 washing tank 10, comprised of upstanding sides 18, 20, 22 and 24, is illustrated as having a fiberglass or like insulative cover 12 connected by hinges 32 and 34 to tank side 18. Cover 12 may embody handles 48 and 50. The tank includes an inclined bottom 56 supported by upstanding legs 26. A liquid outlet drain 28 and seacock 30 may be mounted at one end of the bottom. At the other partitional end of the tank, heating and ventilating cover 14 secured by bolts 16 supports electrically driven or similar impeller motor 38, detergent feed chute 46 and thermostatic controls 44.

Figure 2:
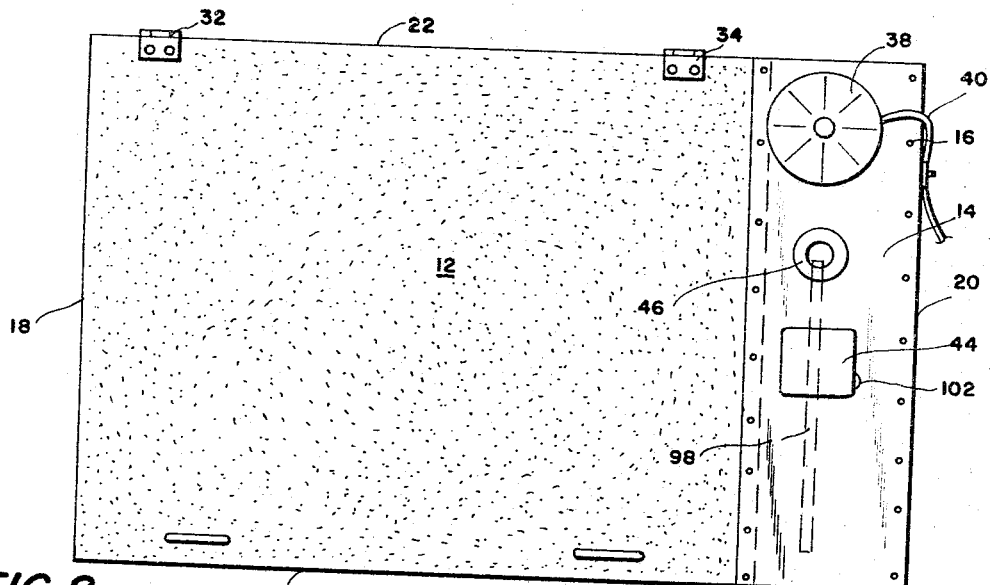
FIG. 2 is a top plan thereof.

As illustrated in FIG. 2, removable partition 60 embodying liquid circulation holes 24 may be mounted between sides 18 and 24 to enclose impeller shaft 62 extending from motor 38 through resilient coupling 64 and mounted at its outer end in steady bushing 66. Impeller 126 may embody a plurality of blades urging the water from intake register 128 downwardly over straightening or breaker vanes 70, thence onto the bidirection baffle 74 inside manifold 72. Baffle 74 embodies inclined sides 112 and 114, respectively, directing the water to distribution pipes 82, 80 and 78, 76.

Motor 38 may be powered by electric outlet wire 40 and controllably "on and off" switch 42. Thermostatic control 44 may embody a control dial 100 and temperature indicator element 102. An immersion-type coil heater 98 may be supported beneath plate 14 so as to maintain the liquid bath at the desired cleaning temperature. A detergent chute 104 leads from inlet 46 to the intake cylinder 128 so as to admit detergent for immediate dispersion in the circulating fluid by impeller 68. As a result, the detergent is immediately distributed throughout the system, thus avoiding objectionable settling of detergent on the tank bottom.

As will be seen, channel irons 52 may be utilized at the tank side tops to support styrofoam or like insulation, so as to maintain the liquid bath with minimum heat loss. Similarly inclined bottom 56 may embody a lower insulation piece 58.

The liquid distribution system comprises pipes 76, 78, 80 and 82. Cotter pins 88 and adjusting holes 90 may be employed adjacent the manifold outlets to provide for unidirectional positioning of the individual pipes. Similar cotter pin elements 92 and adjusting holes 94 may be employed for unidirectional positioning of the pipe ends 96.

Figure 3:
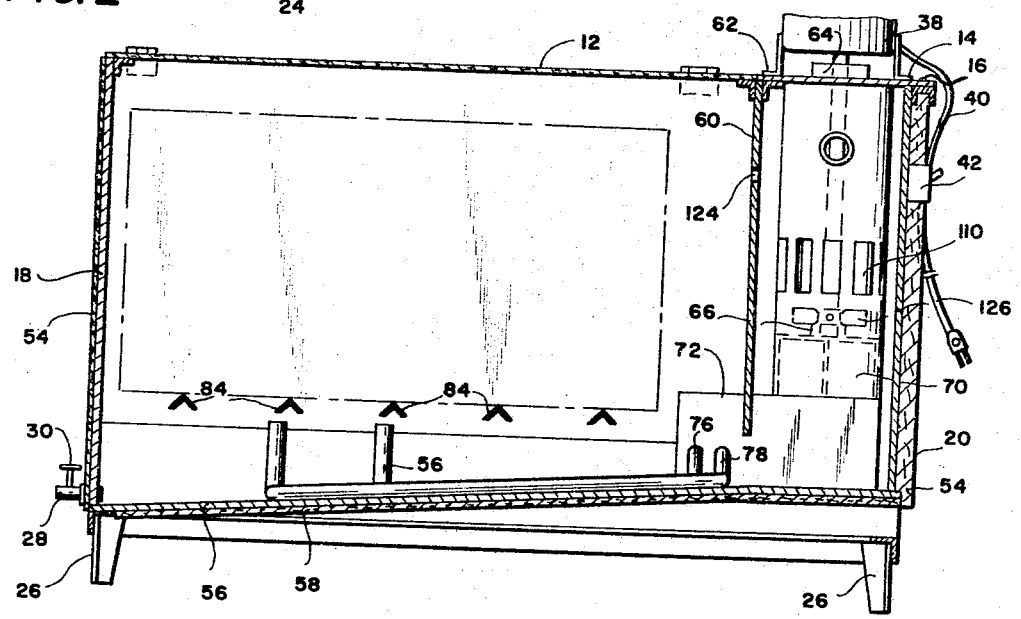
FIG. 3 is a longitudinal section.
Figure 4:
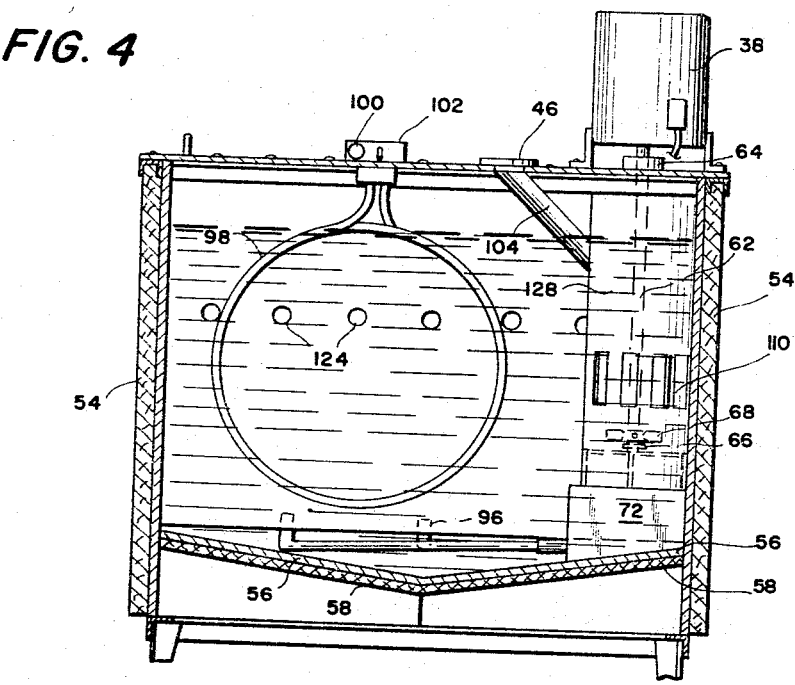
FIG. 4 is an end elevation, partially in section, showing the liquid circulation impeller and heating elements.
Figure 5:
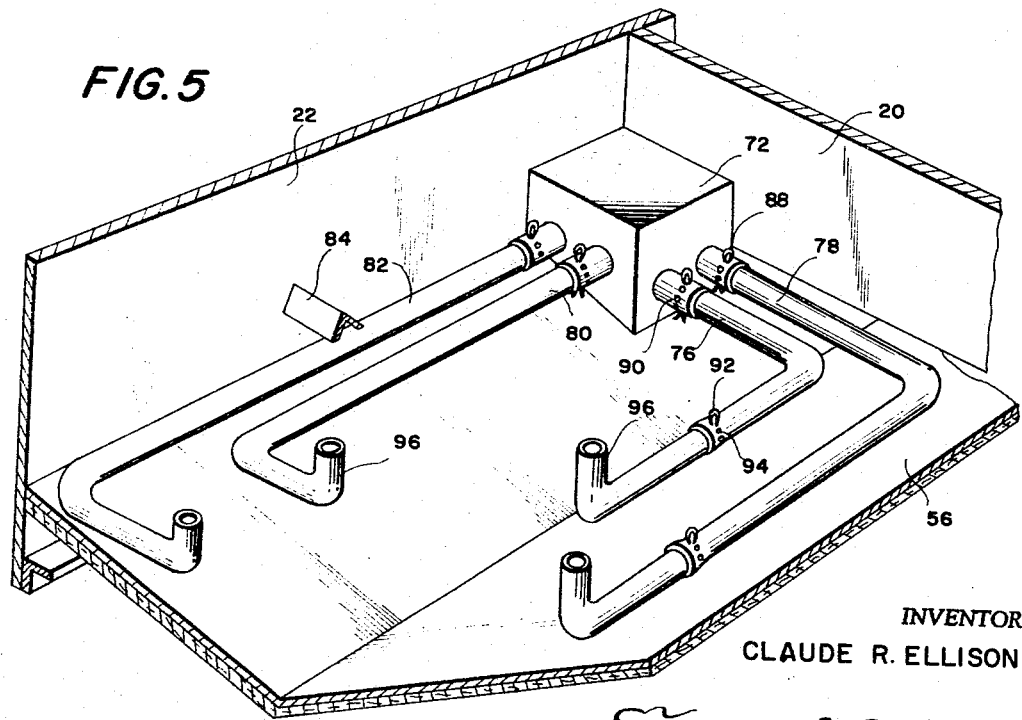
FIG. 5 is an enlarged perspective, partially in section, showing the liquid distribution manifold and distribution pipes adjustably positioned in the tank bottom.
Figure 6:
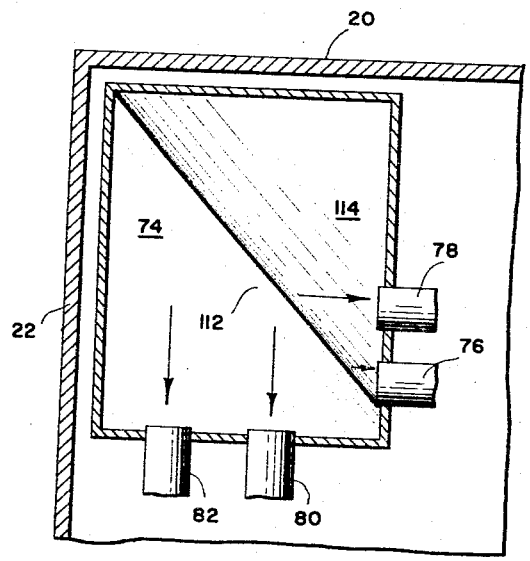
FIG. 6 is an enlarged top plan, partially fragmentary, showning the bi-directional baffle mounted within the manifold for evenly distributing liquid to the various liquid distribution pipes.
Figure 7:
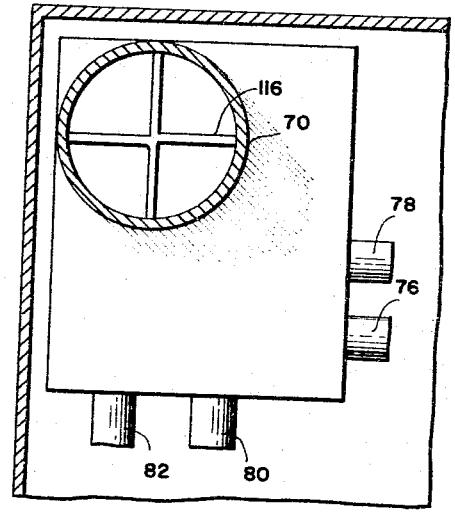
FIG. 7 is an enlarged top plan, partially in section, showing the stabilizer vanes mounted beneath the impeller in the liquid distribtuion system.

Register intake grill 110 admits bath liquid from adjacent the heater 98, thence on to impeller blades 126 and breaker vanes 70, on to baffle 72 and through the distribution pipes 76–82. As a result, there is uniform distribution of the jetting liquid throughout the tank with maximum agitation effect on the work piece shown in phantom in FIG. 3 as supported upon angularly set channel irons 84.

Figure 8:
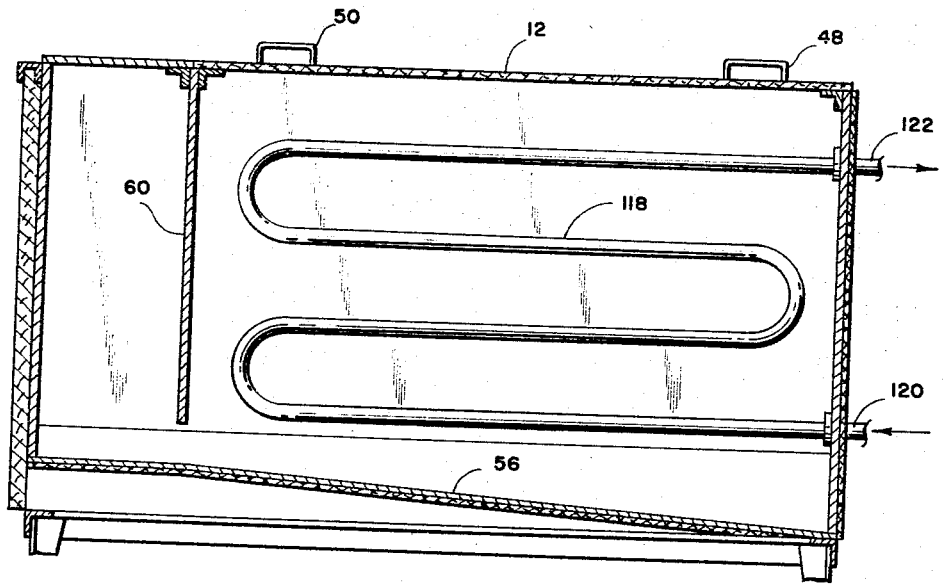
FIG. 8 is a longitudinal section, showing the preheating system for post-bath rinse liquid mounted in a side of the tank.

In the modification shown in FIG. 8 the post-bath liquid rinse is precirculated by means of intake 120, heating conduit 118 and outlet 122. As the wash is completed, therefore, there may be a post-bath rinse of the work piece with water approaching the temperature of the bath.

In one installation, the tank 10 held 150 gallons, circulated by means of a Dayton capacitor A.C. motor, ½ H.P. at 1725 r.p.m. driving cast aluminum impeller. A 4 kw. over the side immersion heater 98 was employed and thermostatically controlled to maintain the liquid temperatur eat 190 to 200° F.

Boiling is avoided, of course, so as to avoid heat loss and loss of detergent material. Conventional detergents such as caustic soda and that trademarked Oakite may be employed. A direct-reading temperature gauge is employed so that the operator can determine the temperature fall off as a heavy engine block is placed into the solution. Consequently, after placing a cold block in the hot bath, a soak can be permitted until the temperature approaches that of the solution. It is found that ½ to 1½ hours is the best time for agitation. Sometimes increased cleaning is obtained by alternate soaking, agitating and soaking.

Manifestly, the heating elements as well as the pumping units can be multiplied and placed for particular requirements. As a result of the complete distribution of liquid in the tank, there is eliminated the necessity of conventional rocking cradles with readily malfunctioning moving parts. Turbulence in the liquid at the top of the tank is eliminated by positioning of the distribution pipe ends 96 adjacent the parts, engine block or the like being cleaned. This eliminaes conventional heat loss induced by turbulence at the top of the tank. Also, distribution is enhanced by breaker vanes 70 which eliminate cavitation in the water and enable uni-directional jetting of the liquid through the pipe ends 96.

Manifestly, various parts may be substituted and rearranged without departing from the spirit and scope of invention, as defined in the subjoined claims.

I claim:
1. A washing tank comprising:
   (a) a liquid-holding tank;
   (b) a heater mounted in said tank so as to contact said liquid;
   (c) a liquid circulation system mounted within said tank and including:
      (i) a rotary impeller mounted within a liquid intake column supported on a manifold and a series of liquid straightening vanes mounted in said column beneath said impeller and adjacent said manifold;
      (ii) one or more liquid distribution pipes leading from manifold to remote portions on the bottom of said tank; and
   (d) a workpiece support grill positioned in said tank above said distribution pipes.

2. A washing tank as in claim 1, said distribution pipes being pivotable at least 180° for adjustability to various work pieces being washed.

3. A washing tank as in claim 2, said tank having an inclined bottom beneath said distribution pipes and a liquid drain outlet extending from the low end of said bottom.

4. A washing tank comprising:
   (a) a liquid-containing tank;
   (b) a heater mounted in said tank so as to contact said liquid;
   (c) a liquid circulation system mounted in a partitioned end of said tank and including:
      a column, having a liquid intake register;
      a plurality of liquid distribution pipes leading from said manifold to remote portions on the bottom said tank;
      motor driving means exteriorly mounted on the top of said column and having a shaft extending to an impeller supported in said column beneath said intake register and above said manifold;
      a plurality of straightening vanes mounted in the bottom of said column beneath said impeller so as to prevent cavitation of liquid urged through said column and into said manifold; and
   (d) a work piece grill positioned in said tank above said distribution pipes.

5. A washing tank as in claim 4, said manifold including a bi-directional baffle mounted beneath said straightening vanes so as to divert pumped liquid equally to said distribution pipes.

6. A washing tank as in claim 4, including insulation on the top, sides and bottom of said tank.

7. A washing tank as in claim 4, said heater including thermostatic means for maintaining liquid in said tank at constant temperature.

8. A washing tank as in claim 4, including:
   a preheating rinse system comprised of a water inlet and water outlet mounted in said tank and a liquid conduit extending between said inlet and outlet within the interior liquid containing portion of said tank, so as to preheat a liquid pumped through said conduit by transfer of the heat maintained in said liquid bath.

References Cited by the Examiner
UNITED STATES PATENTS

| | | | |
|---|---|---|---|
| 2,746,467 | 5/1956 | Dempsey et al. | 134—191 X |
| 3,117,583 | 1/1964 | Hearn et al. | 134—107 |
| 3,170,181 | 2/1965 | Von Werder | 134—107 X |

FOREIGN PATENTS 1,309,139 10/1962 France.

CHARLES A. WILLMUTH, *Primary Examiner.*

R. L. BLEUTGE, *Assistant Examiner.*